United States Patent Office 2,772,240
Patented Nov. 27, 1956

2,772,240

METHOD OF TREATING RESIDUAL LIQUORS OBTAINED IN THE MANUFACTURE OF PULP BY THE SULPHATE CELLULOSE PROCESS

Karl Gustaf Trobeck, Stockholm, and Hilding Olof Vidar Bergstrom, Stocksund, Sweden No Drawing. Application June 10, 1950, Serial No. 167,482

1 Claim. (Cl. 252—183)

This invention relates generally to the treatment of the residual liquors obtained in the manufacture of pulp by the sulphate cellulose process and is concerned more especially with the treatment of the smelt products obtained by burning of the black liquor in the regeneration process in the residual liquors.

By burning of black liquor resulting from the production of sulphate cellulose, gases are obtained which contain in part sulphur dioxide and sulphur trioxide and in part other noxious sulphur-containing compounds such as hydrogen sulphide and mercaptans. If complete combustion could be effected, these gases would naturally as sulphur compounds contain only sulphur dioxide and sulphur trioxide. In practice, however, the fumes from a sulphate cellulose mill are normally obnoxious.

Heretofore, it has been proposed to wash the gases obtained from the combustion of the black liquor with solutions such as pure sodium hydroxide or carbonate solutions, but this has proven to be too expensive. If the liquor which is used for the cooking process (white liquor) is also used for the washing process, the sulphur dioxide and sulphur trioxide are absorbed but other objectionable sulphur-containing compounds such as hydrogen sulphide are liberated into the atmosphere. In order to wash out the sulphur-containing particles in the gases, the latter must be treated with some solution which does not generate sulphur-containing gases or fumes.

On the other hand if fumes from a sulphate cellulose mill are treated with either white liquor or with green liquor, which are oxidized before they are employed as washing liquor, then there is no generation of sulphur-containing gases. By oxidation the sulphide sulphur in these liquors is transformed into thiosulphate sulphur simultaneously with the formation of sodium hydroxide. The reaction takes place according to the following formula:

$$2Na_2S + 2O_2 + H_2O = Na_2S_2O_3 + 2NaOH$$

Thus, by treating fumes from burning the black liquor with an oxidized white liquor or oxidized green liquor, the sulphur-containing gases are absorbed without a simultaneous generation of any sulphur containing gas of hydrogen sulphide.

The treatment of the fmues may take place in a tower or in any conventional apparatus which affords good contact between the gas and the washing liquor.

It is also possible to wash the fumes with oxidized black liquor but this is not so good as this procedure might be accompanied by foam formation, which is absent when washing with oxidized white liquor or oxidized green liquor.

The oxidized white liquor which has been used for the washing of the smoke fumes can be used in the manufacturing process directly together with cooking liquor, or if it should have absorbed too much carbon dioxide, it can be causticized before use.

The oxidized green liquor used for the washing of the smoke fumes shall be causticized to white liquor and be used as a cooking liquor.

Due to the fact that the loss of sulphur is reduced in a sulphate cellulose mill, a higher content of sodium sulphide is obtained in the resultant white liquor. Thus by applying the oxidation process for black liquor, the loss factor of sulphur by evaporation has been eliminated entirely. As a consequence, the sulphide content or the sulphide proportion in the white liquor $$\frac{Na_2S \times 100}{NaOH + Na_2S}$$

has increased substantially. Also other processes, such as washing of the smoke fumes from the soda recovery plant, has resulted in a considerable increase of the sulphide content in a modern sulphate cellulose mill. In the older mills the sulphide proportion was between 20 to 25% while in the more modern mills the proportions range between 30 to 40%.

As a consequence of this increased sulphide content, it has been found that severe corrosions have developed both on the white liquor side as well as on the black liquor side. By oxidation of the black liquor before its concentration by evaporation of the water, the corrosions on the black liquor side have disappeared entirely. However, the corrosions on the white liquor side might still be substantial.

One of the objects of the present invention is to reduce these corrosions occurring in a sulphate cellulose mill. Experiments have shown that if the green liquor, i. e., the liquor from the melting pots before it is causticized, is oxidized with gases containing air or oxygen, its content of $Na_2S$ drops. Experiments have also shown that a sulphide proportion in the white liquor up to 20 to 25% does not have any appreciable corrosive effect. It is therefore advisable that the oxidation of the green liquor should not go beyond the point where the sulphide content in the white liquor subsequently obtained by causticizing is 20 to 25%.

The green liquor may be suitably oxidized by means of air at an elevated temperature. This may be carried out under high pressure, ordinary pressure, or vacuum in a suitable apparatus such as a column provided with a sieve bottom.

The causticized green liquor, i. e., white liquor may also be oxidized.

As previously mentioned, the proportion or content of sodium sulphide is lowered by oxidation. At the same time, however, there is a drop in effective alkali content ($NaOH + Na_2S$) of the oxidized liquor. This drop is very slight, however, since $NaOH$ is also formed during the oxidization of $Na_2S$. If white liquor of 40% sulphide content is oxidized so that after the oxidation it has a sulphide content of only 25%, the effective alkali content drops only 8.5%. White liquor of 35% sulphide content may be oxidized so that the sulphide content drops to 25%. In the latter case the effective alkali content drops only 5.7%. Effective alkali content is accordingly not substantially altered by oxidation of green liquor or white liquor.

It will thus be seen that corrosions on the white liquor side can be eliminated or substantially reduced by the oxidation of the green liquor or possibly the white liquor so that the sulphide content drops to 20 to 25%.

Another advantage inherent in the invention resides in the fact that the sulphate cellulose mills in this manner can produce a more even and smoother pulp since the sulphide content of the white liquor can be kept exactly constant instead of varying between relatively wide limits depending upon variations in its sulphide content.

By way of example, the method according to the present invention may be carried out in a sulphate cellulose mill in the following manner, A suitable amount of green liquor before causticizing is oxidized by air, for example, in a tower provided with sieve bottoms, until its content of sulphide sulphur disappears. The oxidized green liquor is then stored in a separate cistern. A portion of this oxidized green liquor is used for washing the smoke fumes from the burning or ignition of the black liquor. Another portion of the oxidized green liquor is mixed with untreated green liquor before causticizing so that the resultant white liquor after the causticizing of the green liquor mixture will have a suitable sulphide content (20 to 25%). The amount of green liquor to be oxidized depends upon the conent of $Na_2S$. If this should not be very high, it might be sufficient to oxidize only the amount that is needed for the washing of the smoke fumes.

Since certain modifications may be made in the process of the present invention without departing from the scope thereof, it is intended that all matter contained in the foregoing specification be interpreted merely as illustrative and not in a limiting sense.

What is claimed is:

Method of treating green liquor obtained in sulphate cellulose process which comprises oxidizing said liquor until a sulphide content of 0% is obtained, mixing this oxidized green liquor with untreated green liquor before causticizing so that the resultant white liquor has a sulphidity of approximately 20 to 25%.

References Cited in the file of this patent

UNITED STATES PATENTS

| | | |
|---|---|---|
| 1,637,515 | Bradley et al. | Aug. 2, 1927 |
| 1,659,193 | Drewsen | Feb. 14, 1928 |
| 1,855,353 | Jacobson | Apr. 26, 1932 |
| 2,021,548 | Goodeve | Nov. 19, 1935 |
| 2,073,039 | Wilton et al. | Mar. 9, 1937 |
| 2,080,654 | Craig | May 18, 1937 |
| 2,481,408 | Fuller et al. | Sept. 6, 1949 |

FOREIGN PATENTS

| | | |
|---|---|---|
| 174,653 | Great Britain | Feb. 9, 1922 |